Aug. 2, 1927.  F. H. TUPPER  1,637,362

MOLDED PANEL AND METHOD OF MAKING SAME

Filed March 29, 1924

WITNESSES:
Carl J. Loesch
W. C. Wheeler.

INVENTOR
Frank H. Tupper
BY
Wesley G. Carr
ATTORNEY

Patented Aug. 2, 1927.

1,637,362

UNITED STATES PATENT OFFICE.

FRANK H. TUPPER, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDED PANEL AND METHOD OF MAKING SAME.

Application filed March 29, 1924. Serial No. 702,727.

My invention relates to molding and it has particular reference to a process of molding laminated materials and to the articles produced thereby.

One of the objects of my invention is to provide a method of molding shapes in laminated materials, especially those having covering layers of wood thereon.

Another object of my invention is to provide a method of controlling warping in molded laminated articles.

Still another object of my invention is to provide a laminated sheet material which shall be durable and which may be economically manufactured.

Hitherto, laminated articles of external layers of paper or wood and internal layers of other impregnated materials have been molded with letters and figures in the facing sheet. Both raised and depressed letters were molded in but it was difficult to produce a raised, molded portion such as a bead or a boss in the facing sheet when wood was the covering material. Where it was necessary to have such a raised portion in the article, it was the practice to mold on an additional piece of material on the surface and this required a number of operations for the preparation of the additional material prior to molding. When the facing sheet was wood veneer, it was extremely difficult to mold on a separate piece of wood and to produce therein the same grain and color as the facing sheet.

I have discovered that raised portions may be formed in the covering sheet of laminated material, such as a wood veneer facing, without attaching additional molding material to the surface sheet for forming the raised portion. The result is accomplished by combining suitable materials and in using a mold so constituted as to operate on the composite sheet in a particular manner.

Figure 1:
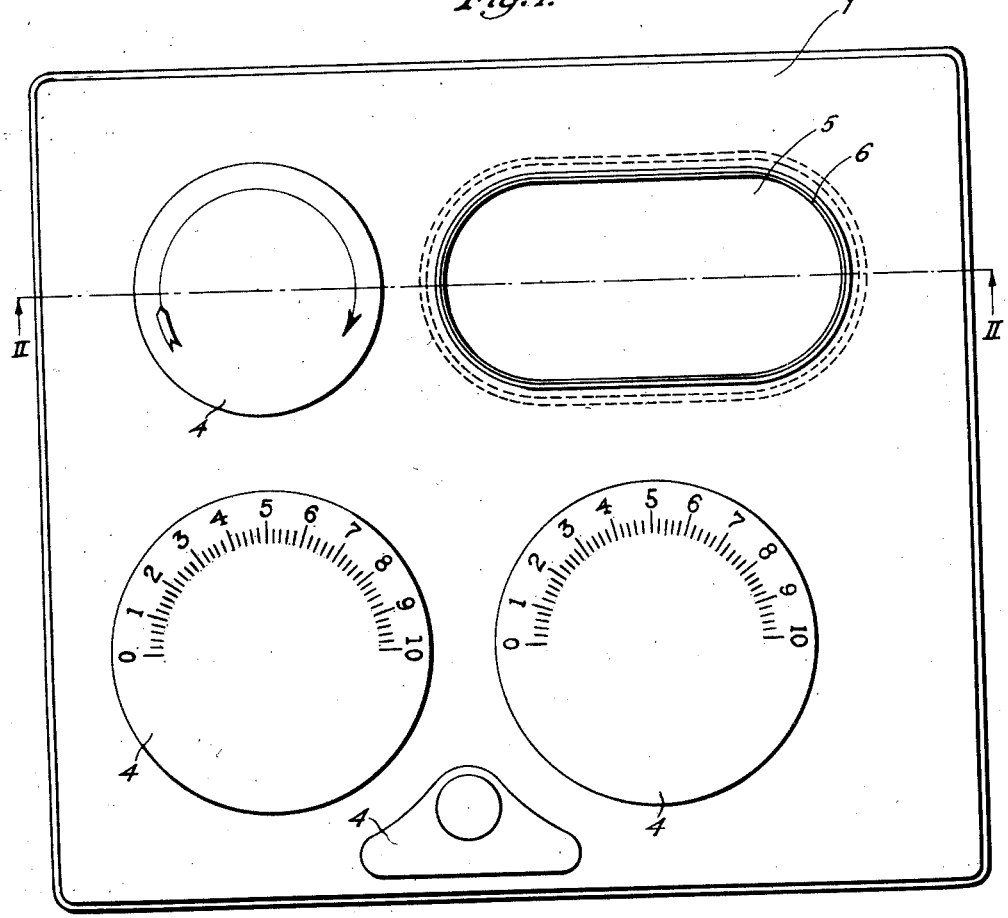
Figure 2:
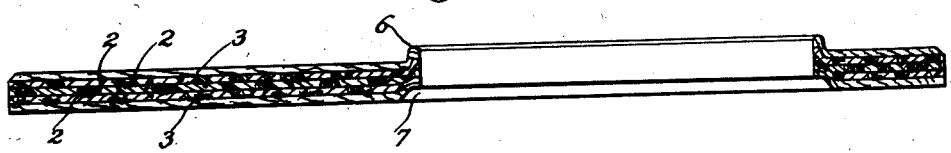
Figure 3:
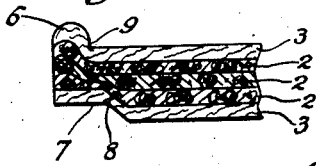

In the drawings constituting a part hereof and in which like characters designate like parts, Figure 1 is an elevational view of a molded panel, Fig. 2 is a cross-sectional view of the panel on the line II—II of Fig. 1, and Fig. 3 is an enlarged, fragmentary cross-sectional view of that portion of the panel which includes the beaded portion.

The panel 1 comprises an inner portion of layers of a compacted, impregnated cotton felt 2 and outer layers of wood veneer 3. Upon the face of the panel, dials 4 are molded and around an aperture 5 therein an upstruck portion or bead 6 is molded in the wood facing material 3.

Fig. 2 illustrates the manner in which the mold operates on the backing layer of the composite sheet, in order to produce the molded shape 6 in the facing of the panel. The mold is provided with a raised portion for forming a countersink 7 in a portion of the backing sheet 3 opposite to and of approximately the same shape as the bead to be molded. The inner layers 2, which are preferably of impregnated cotton felt, are of such firmness that the distortion of the backing material is transmitted thereto without causing them to flow or to be squeezed out of the mold when subjected to heat and pressure. In the molding, the facing layer is therefore distorted in a manner similar to the backing material, when assembled in a mold and subjected to heat and pressure.

The intermediate layers 2 are united into a homogeneous sheet with the facing layers to form a composite panel. The felted material 2 acts as a medium for the transmission of pressure from the backing layer to the facing layer and it is only slightly distorted. The backing layer at the point 8 and the facing layer at the point 9 are distorted by contact with the sharp edges of the mold and the material of the facing sheet is forced into the mold to form the bead 6. The distorted portion of the panel is of about the same thickness as the flat portion thereof.

In some cases, it is desirable to cause the article to bend or warp slightly and I may control the same. When the covering sheets of wood are of the same thickness and the grain is parallel in both facing layers, a perfectly plane surface results, but where the grain in one surface sheet is at an angle to the grain in the other surface sheet, the panel warps after it is molded. The same is true when the sheet of one facing is thicker than the sheet on the opposite facing. The bending or warping may also be regulated in molding the outside layers of comminuted impregnated material by varying the thickness of one of the facings, the amount of warping and bending depending only upon the relative thicknesses of the facing material.

I have provided a method of making laminated material by molding with heat and pressure layers of felted cotton faced with layers of wood or similar molding material, whereby raised or depressed portions may be molded in the facing material and I have provided a means of controlling the warping of molded sheet.

My invention comprises combining any facing material, such as wood veneer or a comminuted impregnated molding mixture, with a cotton or similar felted material which will not flow when subjected to heat and pressure in a mold. By subjecting this material in a mold to heat and pressure and forming a countersunk portion in the backing sheet, I am able to form a corresponding shape in the layers of felted material without the flowing thereof and to cause the facing material in the opposite sheet to flow into a molded form such as a bead or a boss.

Although I have described a specific embodiment of my invention I do not wish to be limited thereto as I may employ materials other than wood veneer for the facing material, such as a comminuted molding mixture. For the inner layers, I may use felted material other than felted cotton which has like molding properties. Other modifications will suggest themselves to those skilled in the art without departing from the spirit of my invention, the scope of which is defined in the annexed claims.

I claim as my invention:

1. A composite article comprising a plurality of molded surface layers having raised portions thereon, and a body portion of felted cotton impregnated with a binder, said body portion and surface layers being consolidated to constitute a hardened unitary mass.

2. A composite article comprising a plurality of molded surface layers having configurations formed therein and a body portion of felted cotton impregnated with a binder, said body portion and surface layers being consolidated to constitute a hardened unitary mass.

3. A laminated article comprising a felted material impregnated with a phenolic condensation product, covering layers of impregnated sheet material and a molded bead in one of said covering layers.

4. A laminated article comprising felted material impregnated with a binder, covering layers of impregnated wood veneer and a molded bead in one of said layers.

5. A laminated article comprising a felted cotton impregnated with a phenolic condensation product, covering layers of impregnated wood veneer and a molded bead in one of said layers.

6. A molded laminated article comprising a main body portion of felted material impregnated with a binder and surface layers of different thicknesses for causing said article to warp.

7. A molded laminated article comprising felted material impregnated with a binder, a layer of molded material on one side of said felted material and a thinner layer of molded material on the other side of said felted material for causing said article to warp.

8. A molded laminated article comprising felted material impregnated with a binder, a layer of wood veneer on one side of said felted material and a thinner layer of wood veneer on the other side of said felted material for causing said article to warp.

9. A molded laminated article comprising felted material impregnated with a binder, a layer of wood veneer on one side of said felted material, a thinner layer of wood veneer on the other side of said felted material for causing said article to warp and a bead molded in one of said layers of wood.

10. A laminated article comprising felted cotton impregnated with a binder, layers of impregnated material on either side of said felted cotton, an indented portion molded on one of said layers and a bead molded in the other layer, all of said layers being consolidated to constitute a unitary hardened mass.

11. A laminated article comprising felted cotton impregnated with a binder, a covering of impregnated wood veneer on either side of said felted cotton, an indented portion in one of said coverings and a bead molded in the other of said coverings.

12. A method of molding a bead in wood which comprises assembling sheets of impregnated felted material with covering layers of wood, and forcing the wood into the bead-forming portion of a mold by transmitting pressure through a portion of the impregnated felted material.

13. The method of molding a bead in wood which comprises assembling layers of impregnated felt and surface layers of wood veneer, forcing a portion of one layer of wood veneer into the bead-forming portion of a mold by applying pressure through the medium of another layer of wood veneer and the said felt.

14. The method of molding shapes in laminated articles which comprises superimposing layers of impregnated wood veneer on either side of layers of impregnated felted material in a mold, applying heat and pressure thereto, forming an indented portion in the veneer on one side of the assembly and forcing the other layer of said veneer into a depression in the mold through the medium of said felted material.

15. The method of molding shapes in laminated articles which comprises superimposing layers of impregnated wood on either side of impregnated felted material, applying heat and pressure thereto, and forcing a portion of said wood layers inwardly on one side and outwardly on the other side of said felted layers.

In testimony whereof, I have hereunto subscribed my name this 20th day of March, 1924.

FRANK H. TUPPER.